United States Patent
Winthrop

[19]

[11] Patent Number: 6,142,627

[45] Date of Patent: Nov. 7, 2000

[54] SHORT-CORRIDOR PROGRESSIVE LENS

[75] Inventor: John T. Winthrop, Stevensville, Mont.

[73] Assignee: Sola International, Inc., Menlo Park, Calif.

[21] Appl. No.: 09/203,142

[22] Filed: Dec. 1, 1998

[51] Int. Cl.$^7$ .................................................. G02C 7/06
[52] U.S. Cl. .......................................................... 351/169
[58] Field of Search .................................. 351/169, 168, 351/170, 171, 172

[56] References Cited

U.S. PATENT DOCUMENTS

| | | | |
|---|---|---|---|
| 4,514,061 | 4/1985 | Winthrop | 351/169 |
| 4,762,408 | 8/1988 | Shinohara | 351/169 |
| 4,861,153 | 8/1989 | Winthrop | 351/169 |
| 5,444,503 | 8/1995 | Kelch et al. | 351/169 |
| 5,488,442 | 1/1996 | Harsigny et al. | 351/169 |
| 5,726,734 | 3/1998 | Winthrop | 351/169 |
| 5,784,144 | 7/1998 | Kelch et al. | 351/169 |
| 5,805,265 | 9/1998 | Umeda | 351/169 |
| 5,886,766 | 3/1999 | Kaga et al. | 351/169 |

OTHER PUBLICATIONS

"Statement Accompanying Information Disclosure Statement Dated Jul. 13, 1999", including an Affidavit signed by the inventor, Dr. John T. Winthrop Dated May 7, 1999.

*Primary Examiner*—Georgia Epps
*Assistant Examiner*—Jordan M. Schwartz
*Attorney, Agent, or Firm*—Cantor Colburn LLP

[57] ABSTRACT

A progressive ophthalmic lens designed for use in eyeglass frames having a vertical ("B") dimension <36 mm is presented. The lens features a short (nominally 13–14.5 mm) progressive corridor and a novel treatment of the progressive optics that compensates for the distortion effects, i.e., astigmatism, that would otherwise result from the compression of the optics into a smaller than usual area. That includes (1) permitting a small amount of the astigmatic aberration to extend into the peripheral zones of the distance portion above the distance fitting center, with 0.50 D isocurves of surface astigmatism forming an included angle of about 110°, (2) defining a circle of 30 mm diameter centered 2 mm vertically below the distance fitting center in which the maximum value of unwanted astigmatism does not exceed the add value of the lens plus 0.25 D, (3) distributing astigmatism so that the isocurves from $D_1$ to $D_2$ on upward arcs (3,4) of the 30 mm circle adjacent the reading zone are much more closely spaced than the isocurves from $D_1$ to $D_2$ on downward arcs (1,2) of the 30 mm circle from the distance zone (where $$D_1 = \frac{0.5 \times \Delta P}{2}, \text{ and } D_2 = \frac{1.5 \times \Delta P}{2},$$

where $\Delta P$ is the add value of the lens), and (4) establishing a value $\rho$ of from 2.7–5 for the ratio of the magnitude of the gradient of astigmatism over the combined lengths of arcs 3 and 4 to the magnitude of the gradient of astigmatism over the combined lengths of arcs 1 and 2. Examples of preferred embodiments are presented having continuous and discontinuous meridional power laws.

21 Claims, 8 Drawing Sheets

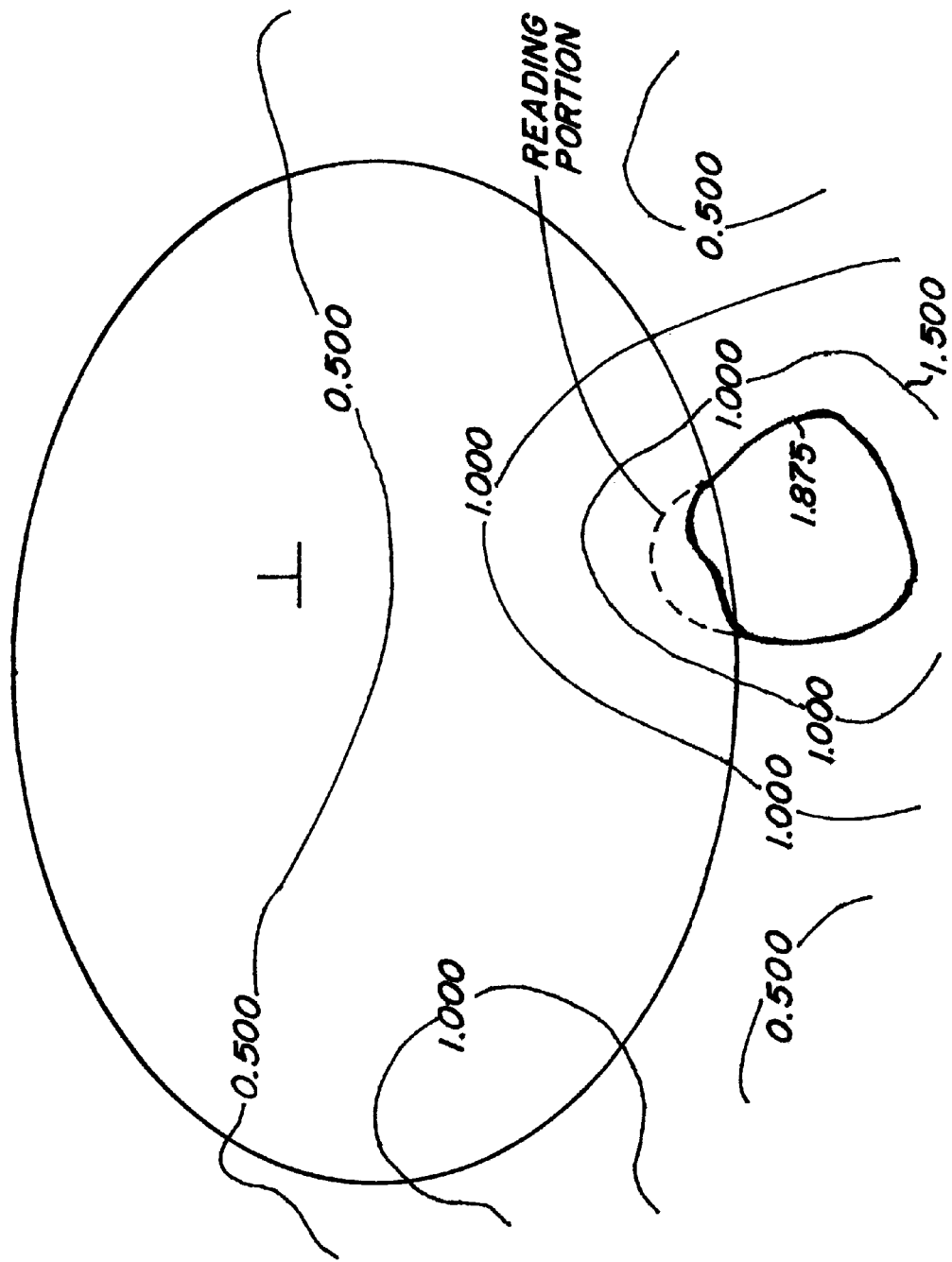

SHORT-CORRIDOR PROGRESSIVE LENS

BACKGROUND OF THE INVENTION

This invention relates to the field of ophthalmic progressive multifocal lenses. In particular, it relates to a new progressive lens design having both a short progressive corridor and a progressive geometry compensated for the unwanted effects of the short corridor, making the lens especially suitable for use in small eyeglass frames.

It is appropriate to being by defining the corridor length of a progressive lens. In general, the term refers to the vertical drop from the distance fitting center to the top or beginning of the reading portion. But precisely where does the corridor end and the reading portion begin? According to the ANSI Z80.1-1995 American National Standard for Prescription Ophthalmic Lenses, the tolerance on addition power for multifocal and progressive addition lenses is ±0.12 D for additions up to 4.00 D. Thus, as illustrated in FIG. 1, it is reasonable to define the corridor length of a progressive lens as the vertical drop from the distance fitting center (represented throughout all drawings by the symbol

to the point of the corridor where the nominal add power, less ⅛ D (0.125 D), is attained.

By this definition, the corridor length of the average commercially-available progressive lens is about 17 mm. According to the manufacturers, these lenses generally require a 22 mm frame depth below the distance fitting center. Provided that the frame depth requirement is met, a lens having a 17 mm corridor can be expected to provide good near vision utility. Moreover, the associated gradients of power and astigmatism in the progressive surface of a lens having a 17 mm corridor are usually weak enough to ensure good overall visual comfort.

The 22 mm frame depth required for the typical progressive places a lower bound on the vertical or B dimension of the frame in which the lens is mounted. For example, as depicted in FIG. 2, if the fitting center is positioned 4 mm above the equator of the frame, then to ensure sufficient reading utility, the B dimension of the frame can be no less than 2×(22−4)=36 mm. In recent years, however, frame sizes with B<36 mm have become increasingly popular throughout the world. In Europe and Asia, for example, the B dimension of the average frame is currently 30–35 mm and 25 mm is not uncommon. Lenses having a 17 mm corridor and requiring a 22 mm frame depth generally cannot be used in such small frames without sacrificing the reading function of the lens. For example, as illustrated in FIG. 3, if the fitting center of a lens having a 17 mm corridor is placed 4 mm above the equator of a frame having a B dimension of 30 mm, then the drop from the fitting center to the lower inside edge of the frame will be 30/2+4=19 mm. Thus, vertically only about 2 mm of prescribed reading power lies within the boundary of the frame. This is inadequate for all but the most perfunctory near-vision tasks.

Thus, the need exists to design a progressive lens specifically for frames having a B dimension less than 36 mm. At first sight this seems to be a simple task. Suppose that one wants to design a lens having a 13 mm corridor, 4 mm shorter than the current average. A design meeting this requirement might seem to be readily obtained simply by scaling down the layout of a conventional long-corridor design by a factor 13/17=0.76, while maintaining the same add power. Unfortunately, this simple design procedure also increases the surface power and astigmatism gradients of the scaled-down lens by a factor 17/13=1.31, an increase of 31%. The distortion effects generated by these elevated gradients may not be tolerated by most wearers of the lens. That, in fact, is why progressive lenses today are designed with longer corridors. To illustrate, FIG. 4 shows the surface mean power and astigmatism contour plots for a conventional prior art progressive having a relatively short corridor (15.5 mm) and overlayed by a frame of B=30 mm. The astigmatism plot reveals particularly strong gradients of astigmatism throughout most of the lens and elevated levels of astigmatism (2.5 D), all resulting from the shortness of the corridor. In other words, one cannot achieve an acceptable short corridor lens by just shortening the corridor of a long corridor lens.

SUMMARY OF THE INVENTION

The task of designing a lens having a corridor much shorter than 17 mm poses a special problem for the designer. The fundamental question is, having shortened the corridor to, say, 13 mm, what does one do with the compressed and intensified aberrations (surface astigmatism) that result from shortening the corridor? In accordance with the present invention, a design for a short-corridor lens is disclosed in which the progressive aberrations are distributed in such a manner as to achieve an aberration level comparable to, or even below, that of a conventional long-corridor progressive. Specifically, in the lens of the invention, much of the inherent progressive aberration is concentrated in the little-used areas on either side of the reading portion where it will not be noticed. This results in a much lower level of aberration in the distance and intermediate areas of the lens than would be otherwise possible. Aspects of the invention include (1) permitting a small amount of the astigmatic aberration to extend into the peripheral zones of the distance portion above the distance fitting center, with 0.50 D isocurves of surface astigmatism forming an included angle of about 110°, (2) defining an imaginary circle of 30 mm diameter centered 2 mm vertically below the distance fitting center in which the maximum value of unwanted astigmatism does not exceed ΔP+0.25 D, where ΔP is the add of the lens, (3) distributing astigmatism so that on upward arcs (3,4) of the 30 mm circle adjacent the reading zone the isocurves between dioptric value 0.5×ΔP/2.00 and 1.5×ΔP/2.00 (where ΔP is the add power of the lens) are much more closely spaced than those same isocurves on downward arcs (1,2) of the 30 mm circle from the distance zone, and (4) establishing a value ρ of from 2.7–5, depending on the add value of the lens, for the ratio of the magnitude of the gradient of astigmatism averaged over the combined lengths of arcs 3 and 4 to the magnitude of the gradient of astigmatism averaged over the combined lengths of arcs 1 and 2.

DESCRIPTION OF THE DRAWINGS

FIG. 3 shows the mean power plot of a conventional 2.00 D add progressive lens having a corridor length of 17 mm, mounted with its distance fitting center 4 mm above the equator of a frame having a B dimension of 30 mm. Vertically, only 2 mm of prescribed reading power lies within the boundary of the frame. Isopower curves of 0.50 D, 1.00 D, 1.50 D and 1.875 D from the distance zone to the reading zone are shown.

It will be understood that in FIGS. 3, 4a, 4b, 5a and 5b shows isocurves of surface mean power or surface astigmatism of various unedged lenses overlaying or overlaid by frames (represented by ovate curves) of various B dimensions. FIGS. 6 and 8 represent lenses of the invention in uncut, i.e., unedged, form.

DESCRIPTION OF THE PREFERRED EMBODIMENT

At least one of the two surfaces of the lens of the invention is a continuously differentiable aspheric representing the so-called progressive surface of the lens. However, for purposes of description, the progressive surface will be assumed to comprise the anterior or convex surface of the lens body. The progressive surface is divided generally vertically into three viewing zones extending across the lens; an upper zone (F) for viewing distant objects, a lower zone (N), including a reading zone, for viewing near objects, and an intermediate zone (I) situated between the upper and lower viewing zones for viewing objects at intermediate distances. The distance and reading zones may be generally spherical. The lower zone includes a full power reading zone, and the geometry of the intermediate zone is designed to include a channel, or progressive corridor, inclined 9° from the vertical, having minimized astigmatism along its midline, and through which the eye tracks when viewing objects at intermediate distances. Many general methods for the generation of progressive surfaces having these basic features are known. Those of U.S. Pat. No. 4,861,153 and U.S. Pat. No. 5,726,734 may be considered exemplary.

Notwithstanding this 9° incline discussed above, the short corridor dimensions specified for the present invention are vertical dimensions, i.e., measured directly below the distance fitting center.

The present invention is exemplified in the following examples.

EXAMPLE 1

Figure 1:
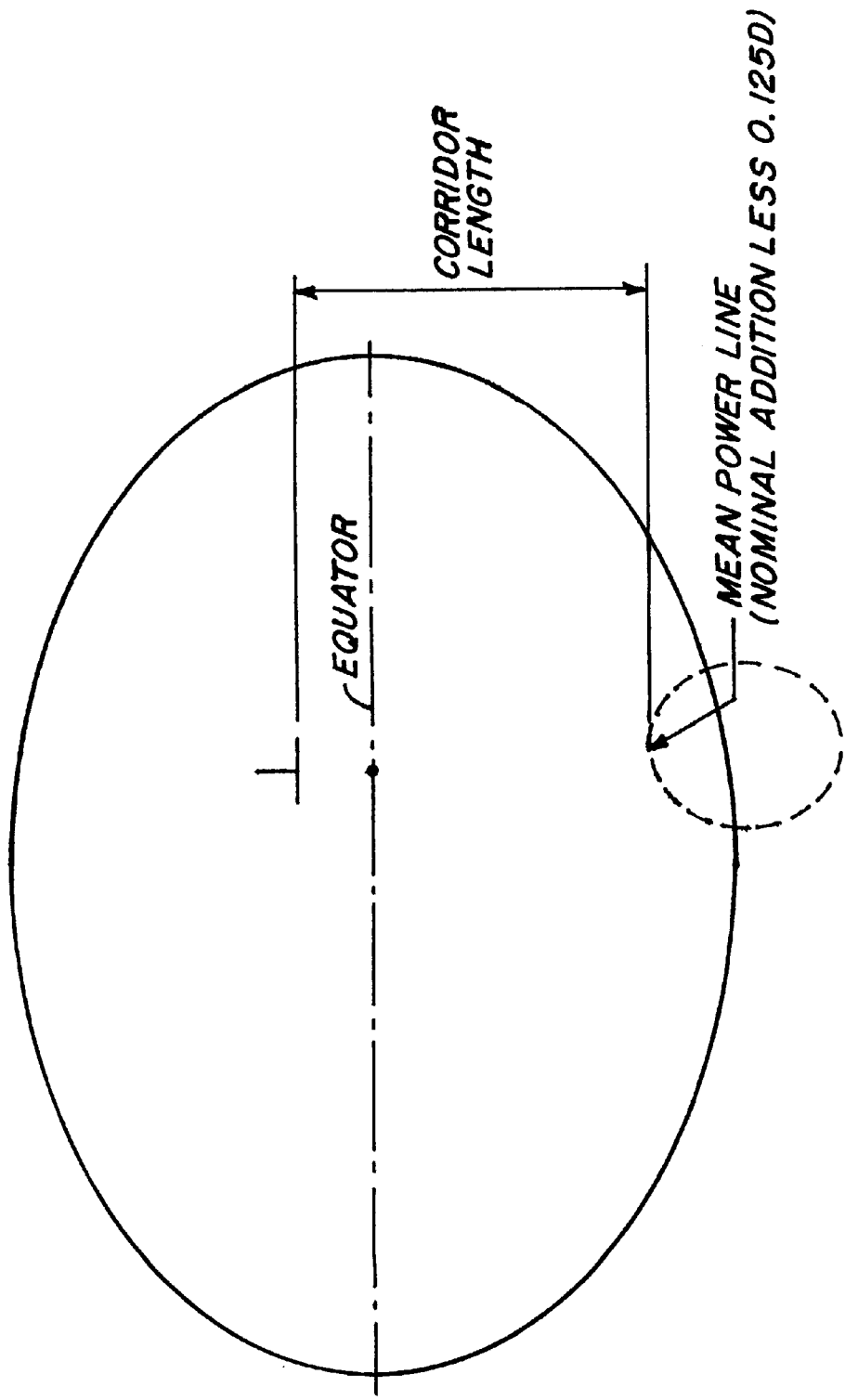
FIG. 1 illustrates an optometrically correct definition of corridor length. Corridor length is here defined as the vertical drop from the distance fitting center to the point of the corridor where the nominal add power, less 0.125 D, is attained.
Figure 2:
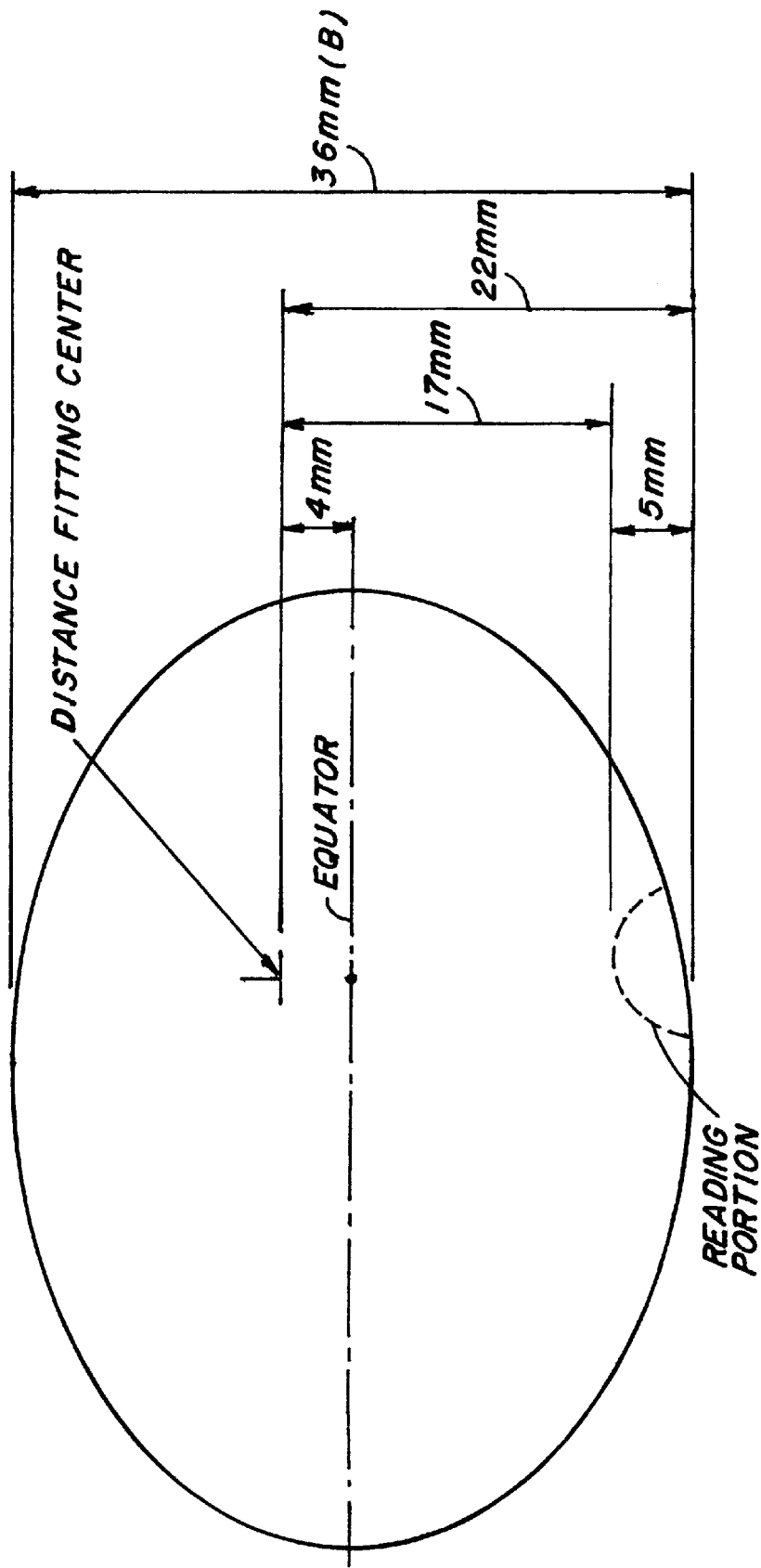
FIG. 2 illustrates the minimum frame size needed for a conventional progressive lens requiring a 22 mm frame depth below the distance fitting center. With the distance fitting center located 4 mm above the equator, the minimum vertical frame dimension (the "B" dimension) is 36 mm.
Figure 4B:
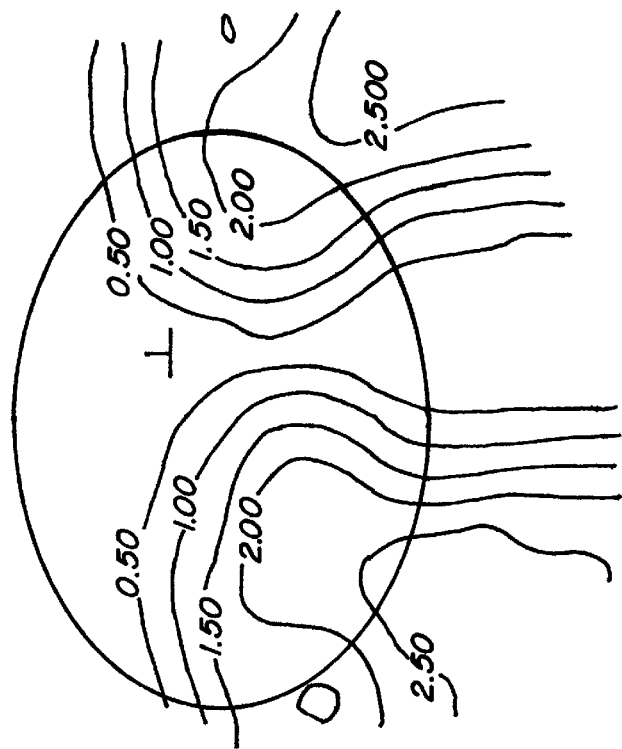
FIGS. 4a and 4b show the surface mean power and astigmatism distributions, respectively, of a conventional 2.00 D add prior art design having a relatively short (15.5 mm) progressive corridor mounted in a frame having a B dimension of 30 mm. Isopower curves of 0.50 D, 1.00 D, 1.50 D and 1.875 D from the distance zone to the reading zone are shown. Isoastigmatism curves from 0.50 D to 2.5 D are shown in 0.50 D intervals.
Figure 4A:
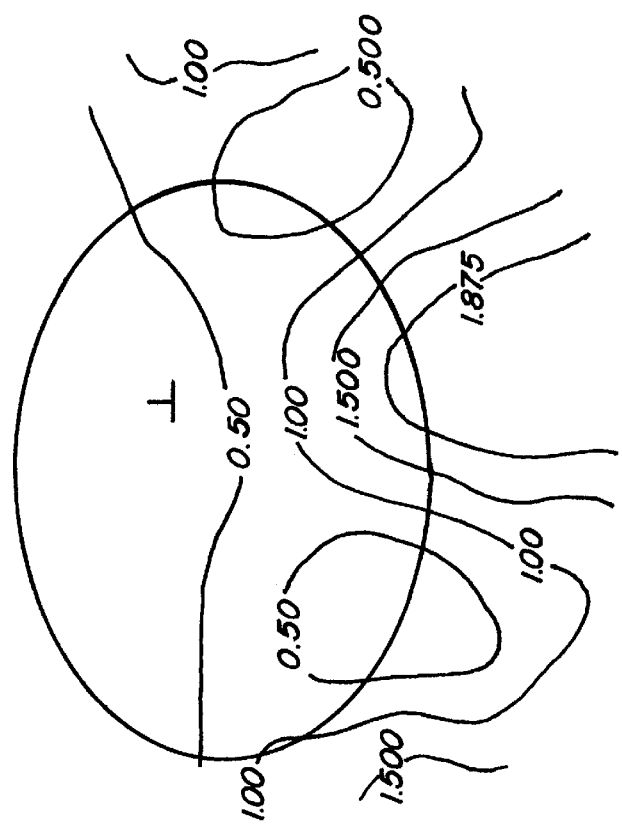
Figure 5B:
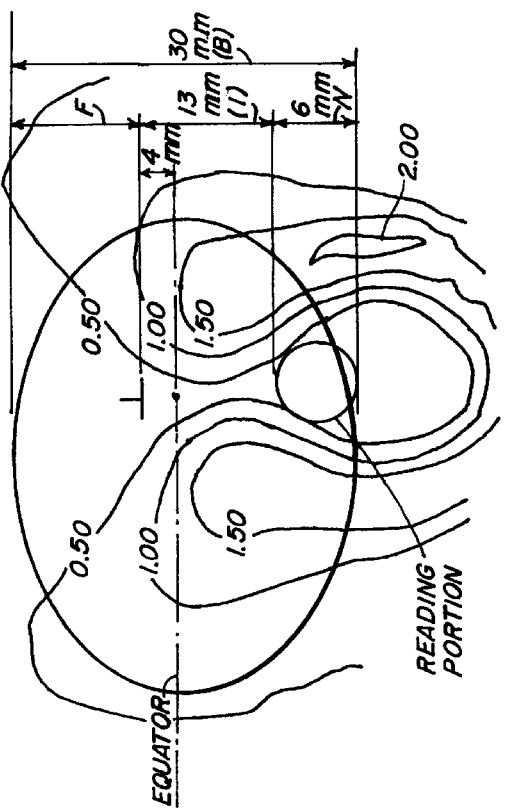
FIGS. 5a and 5b show the surface mean power and astigmatism distributions, respectively, of a 2.00 D add embodiment of the invention. The corridor length is 13 mm. Isopower curves of 0.50 D, 1.00 D, 1.50 D and 1.875 D (nominal add of 2.0 D−0.125 D) are shown. Isoastigmatism curves from 0.50 D to 1.50 D are shown in 0.50 D intervals.
Figure 5A:
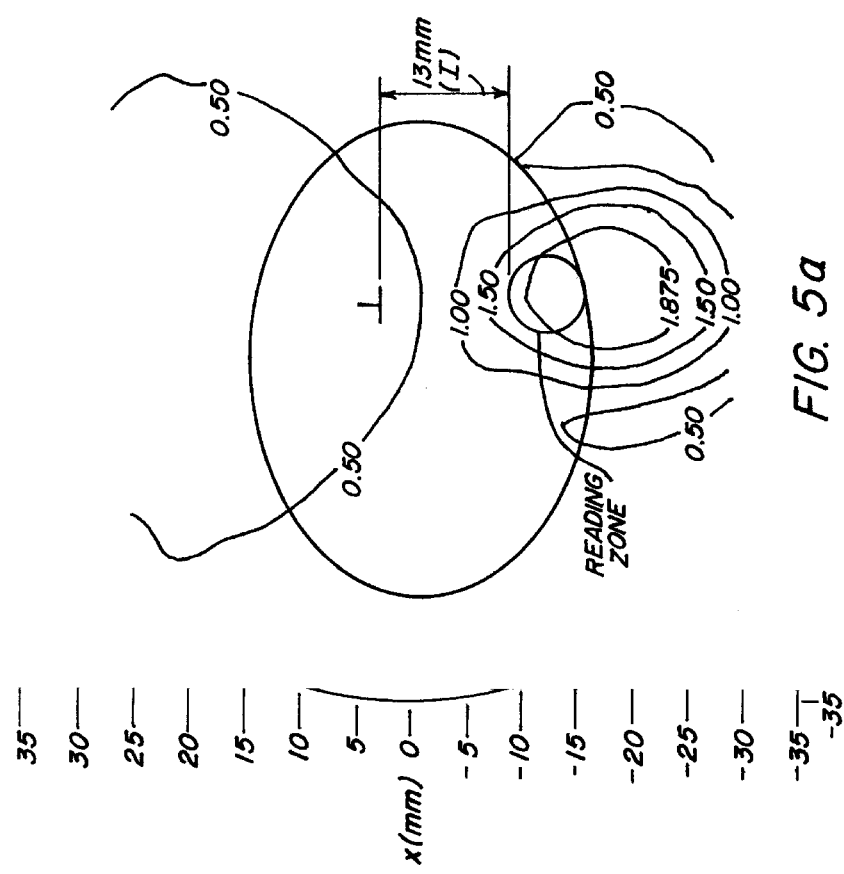

In FIGS. 5a and 5b is shown the surface mean power and astigmatism diagrams for a first preferred embodiment of this invention having a short corridor of 13 mm in a lens of nominal 2.00 D addition. When placed in a frame of 30 mm B dimension and with the distance fitting center 4 mm above the equator, this lens results in a reading zone of 6 mm in the vertical dimension. In this first example, the mean power (FIG. 5a) along the midline of the corridor progresses smoothly and continuously from the top toward the bottom of the corridor.

Figure 6:
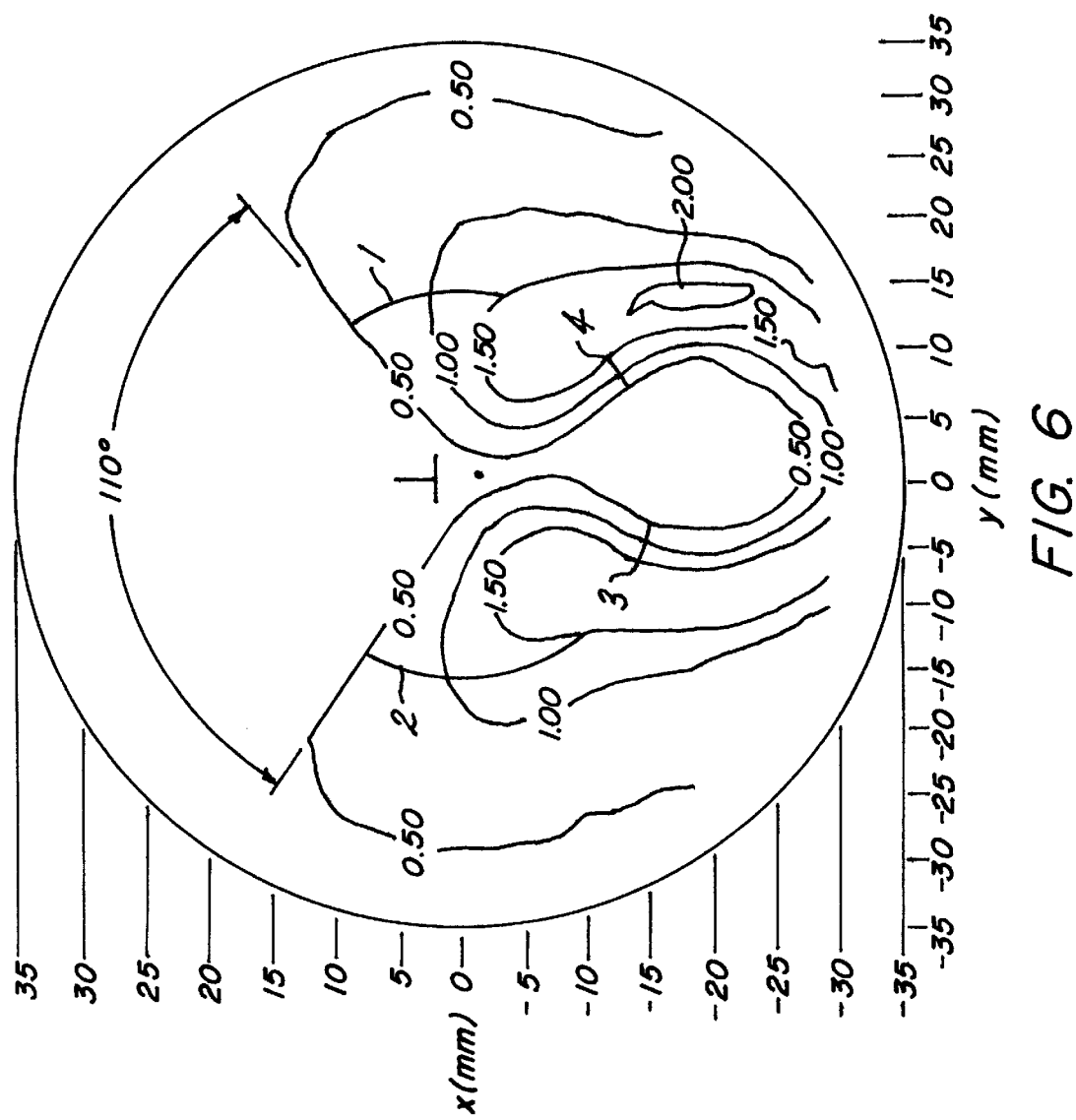
FIG. 6 shows in more detail the distribution of surface astigmatism of the 2.00 D add lens embodiment of the invention depicted in FIG. 5.

Referring to FIGS. 5b and 6, the preferred embodiment incorporates a unique distribution of surface astigmatism having several characteristics which prevent the development of excessive surface astigmatism and distortion that would otherwise occur as a result of the shortened corridor.

First, as shown in the astigmatism plots of FIGS. 5b and 6, in order to distribute the astigmatism over as wide an area as possible, a small but tolerable amount of astigmatic aberration (typically 0.50 D) is allowed to extend into the peripheral zones of the distance zone above the level of the distance fitting center. That is, those peripheral zones are not spherical. In the preferred embodiment, the curves of 0.50 D astigmatism extending above the distance fitting center form an included angle of about 110°.

Second, with reference to an imaginary circle of 30 mm diameter centered 2 mm directly, i.e., vertically, below the distance fitting center, the 0.50, 1.00 and 1.50 D isocurves of astigmatism are much more closely spaced (i.e., have a greater gradient) along designated arcs of the circle extending upwardly from adjacent the reading zone (arcs 3, 4 of FIG. 6) than are the spacings between the 0.50 D, 1.00 D and 1.50 D isocurves along the designated arcs of that same circle extending downwardly from the distance portion toward or into the intermediate portion of the lens (arcs 1,2 of FIG. 6). In this manner, advantageously weak gradients of surface astigmatism at the intermediate level are achieved by permitting much stronger gradients to appear in the little-used areas located on either side of the reading portion, where their effects will not be noticed or will be removed by the lens edging process.

Third, within the 30 mm circle centered 2 mm below the fitting center of this lens, the maximum value of unwanted surface astigmatism nowhere exceeds 2.00 D.

A quantitative characterization of the distribution of surface astigmatism, $A(x,y)$, can be expressed in terms of the magnitude, $v$, of the gradient of the surface astigmatism evaluated along specific arcs of the 30 mm circle superimposed on the lens surface, where $$v = |\nabla A|, \tag{1}$$

$\nabla$ being the two-dimensional gradient operator, i.e., $$\nabla = \hat{i}\frac{\partial}{\partial x} + \hat{j}\frac{\partial}{\partial y} \tag{2}$$

where $\hat{i}$ is the unit vector in the x direction and $\hat{j}$ is the unit vector in the y direction. Let an imaginary circle 30 mm in diameter be superimposed on the astigmatism contours of the preferred embodiment of FIG. 6, with the center of the circle coinciding with a point 2 mm directly below the distance fitting center. Using graphical or numerical methods, one now calculates the average value $<v>$ of the magnitude of the gradient of surface astigmatism on those segments of the 30 mm circle lying between the 0.50 D and 1.50 D lines of astigmatism. There are four such segments. For the arc segments 1 and 2 extending downwardly from the 0.50 D isocurve adjacent the distance portion toward or into the intermediate portion and outward of the boundary between the distance and intermediate areas of the lens, the magnitude of the gradient of astigmatism averaged over the combined lengths of arcs 1 and 2 is found to be $$<v>+_{1+2} = 0.074 \text{ D/mm}, \tag{3}$$

whereas for the arc segments 3 and 4 extending upwardly from the 0.50 D isocurve to the 1.50 isocurves of astigmatism adjacent the reading portion, the magnitude of the gradient of astigmatism averaged over the combined lengths of arcs 3 and 4 is found to be $$<v>_{3+4} = 0.326 \text{ D/mm}, \tag{4}$$

The ratio, $\rho$, of these two average gradient values characterizes the novel astigmatism distribution of the preferred embodiment:

$$\rho = <v>_{3+4}/<v>_{1+2} = 4.4 \tag{5}$$

In accordance with this invention, astigmatism should be distributed in the short corridor lens so that the ratio $\rho$ is between about 2.7 and about 5, with the ratio $\rho$ always being determined as set forth above on the basis of a superimposed 30 mm circle centered 2 mm below the distance fitting center, and for a 2 diopter add lens, with the arcs 1, 2 extending between the 0.50 D and 1.50 D isocurves as set forth above, and the arcs 3, 4 extending between the 0.50 D and 1.50 D isocurves as set forth above. Among prior art 2.00 D add progressive lenses known to the inventor to be suitable for small frames (i.e., having corridors shorter than about 15 mm) none has a $\rho$ value larger than 2.0. One known prior art lens has a 16 mm corridor and a $\rho$ value of 2.32. These prior art lenses underscore the uniqueness of this invention.

From the law of Minkwitz it is known that the width of a short progressive corridor (generally understood to be the distance between 0.50 D astigmatism lines or between 1.0 D astigmatism lines on opposite sides of the corridor) is necessarily narrower than that of a long corridor. Significantly, this fact has no direct bearing on the overall comfort of the lens of this invention. Overall comfort is determined not locally by corridor width but globally by the gradients and magnitude of the unwanted astigmatism. A generally soft distribution of astigmatism is experienced as visually more comfortable than a hard distribution.

It is technically possible to design a lens having a $\rho$ value even larger than about 5. In other words, the astigmatism gradients in the intermediate portion of the lens could be further softened by permitting even stronger astigmatism gradients at the lateral boundaries of the reading portion. However, this is not advisable. Gradients that are too strong become a distraction and may not be accepted by most wearers. Accordingly, as a general rule, the value of the ratio $\rho$ should be about 5.0 or less. At the other extreme, the value of $\rho$ should be at least about 2.7 to ensure sufficiently weak gradients at the intermediate level of the lens. In summary, to take full advantage of the distribution principle herein disclosed, the value of the ratio $\rho$ should lie in the approximate range $$2.7 \leq \rho \leq 5.0 \tag{6}$$

As indicated in the mean power diagram of FIG. 5a, the design of the 2.00 D addition lens has a corridor length of 13 mm, 4 mm shorter than the industry average of 17 mm. Such a lens (13 mm corridor length) when mounted in a frame of B=28 mm provides the same vertical reading field, i.e., 5 mm as that of a conventional progressive (17 mm corridor length) mounted in a frame of B=36 mm, assuming the same locations of the distance fitting centers of these lenses relative to the centers of their respective frames. Thus, on the basis of corridor length alone, the preferred embodiment with its 13 mm corridor solves the problem of fitting progressive lenses into a small frame. The 2.00 D add lens is designed so that those 0.50 D lines of astigmatism are low enough in the distance portion so that the horizontal separation between the 0.50 D lines of astigmatism is about 9 mm at the level of the distance fitting center.

Although attention has focused thus far on the 2.00 D addition, the same design principles apply to the other addition values as well. In all additions of the preferred embodiment, the lines of 0.50 D surface astigmatism located near the distance zone form an included angle of about 110°. The values of the remaining key parameters of the preferred embodiment are given in the following table for a range of addition values:

TABLE 1

|  | Addition (D) | | | | | | | | |
|---|---|---|---|---|---|---|---|---|---|
|  | 1.00 | 125 | 1.50 | 1.75 | 2.00 | 2.25 | 2.50 | 2.75 | 3.00 |
| Corridor Length (mm) | 13.0 | 13.0 | 13.0 | 13.0 | 13.0 | 13.2 | 14.0 | 14.3 | 14.5 |
| Maximum surface astigmatism (D) | 1.00 | 1.25 | 1.50 | 1.75 | 2.00 | 2.25 | 2.75 | 3.00 | 3.25 |
| Gradient ratio $\rho$* | 5.0 | 3.7 | 4.0 | 4.2 | 4.1 | 3.6 | 3.7 | 3.5 | 3.0 |

*$\rho$ is estimated for the 1.00 add; $\rho$ is measured and averaged over several lenses for all other adds.

Thus the preferred corridor lengths range from about 13 mm for additions 1.00–2.00 D, and up to about 14.5 mm for the 3.00 D add. As defined above, these corridor length values represent the vertical drop from the distance fitting center to the point of the corridor where the nominal add power, less 0.125 D is attained. Corridors of this length will provide adequate near-vision utility in frames have B<36 mm. Of course much shorter corridors are technically possible, but lead to unacceptably strong gradients of astigmatism and are to be avoided. Generally the tabulated values of corridor length are the recommended ones for each preferred configuration. As used in this invention, the term "short corridor" means a corridor length of not more than 16 mm, which is a nominal 14.5 mm corridor as in the above table for a 3.00 add lens, with a plus tolerance of 1.5 mm. In this context there is no need to specify a minus tolerance.

An especially beneficial feature of the preferred embodiment is that the maximum value of unwanted surface astigmatism found within a 30 mm circle centered 2 mm directly below the distance fitting center never exceeds the add value for additions 1.00 D–2.00 D and never exceeds (add +0.25) D for additions 2.50–3.50 D. Maximum astigmatism values such as these are typical of progressive lenses having much longer corridors. Thus the intermediate visual acuity provided by the preferred embodiment of the invention is at least equivalent to, and in many cases better than, that provided by conventional long-corridor progressives. Generally, the tabulated values of maximum astigmatism can be exceeded by 0.25 D without undue loss of acuity.

The values of $\rho$ presented in the table for additions other than 2.00 D are determined by calculating average gradient values along arcs similar to those of FIG. 6 extending between astigmatism lines of magnitude $0.50 \times \Delta P/2.00$ and $1.50 \times \Delta P/2.00$, where $\Delta P$ is the add value of the lens. From the table it will be noted that the value of the gradient ratio $\rho$ tends to decrease with increasing add value. The reason for this is that the average gradient $<v>_{3+4}$ is not allowed to grow in constant proportion to $<v>_{1+2}$. For if it did, it would result in intolerably strong distortion effects at the lateral portions of the reading zone of the higher add lenses. The tabulated values of $\rho$ conform to the range of values specified by Equation (6).

EXAMPLE 2

Figure 7:
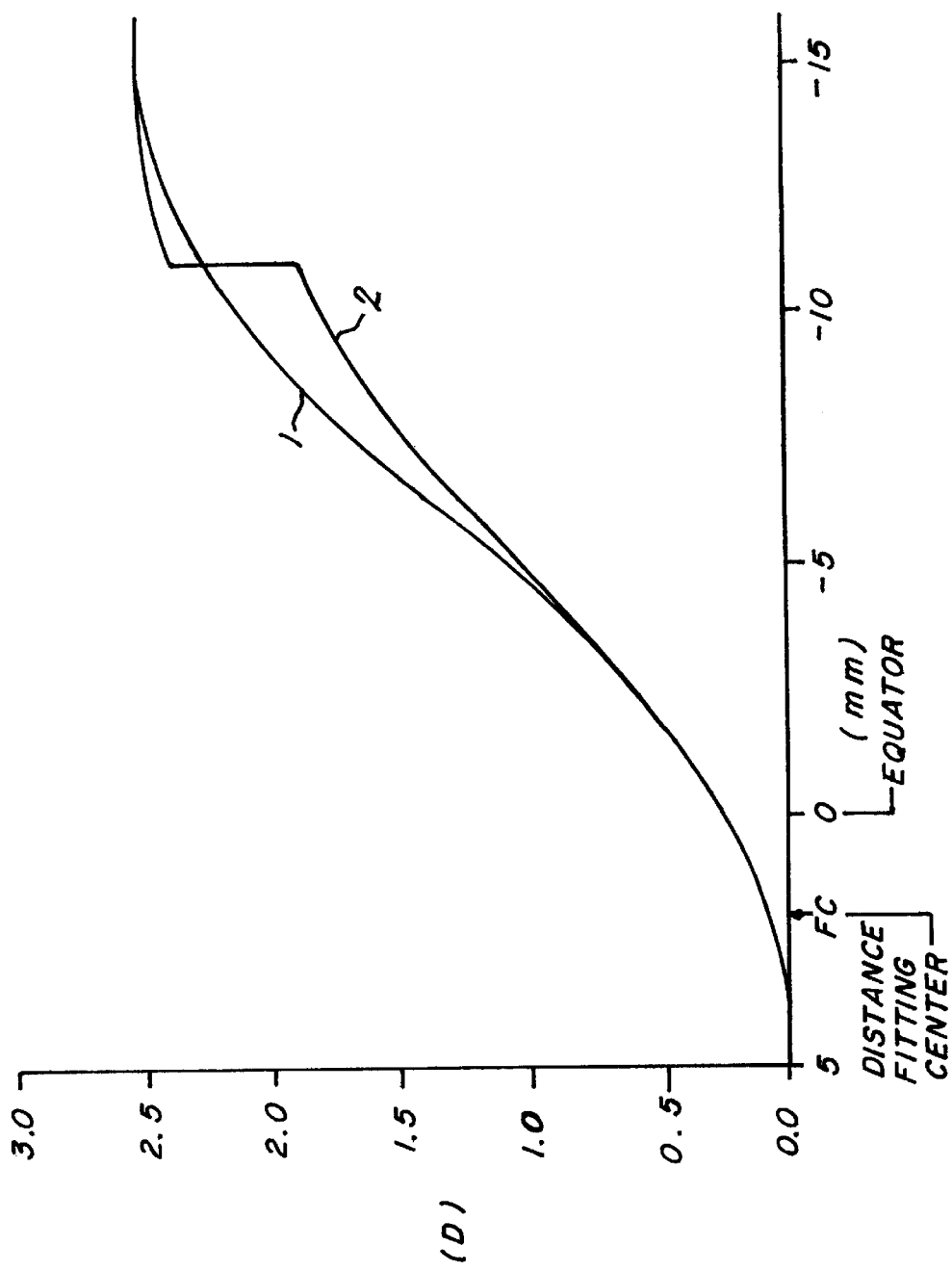
FIG. 7, curve 1, represents the continuous meridional power law for a 2.50 add embodiment of the invention. Curve 2 represents a discontinuous power law for a second embodiment of the invention having the same add power of 2.50 D. Curve 2 includes a power step of 0.50 D.
Figure 8:
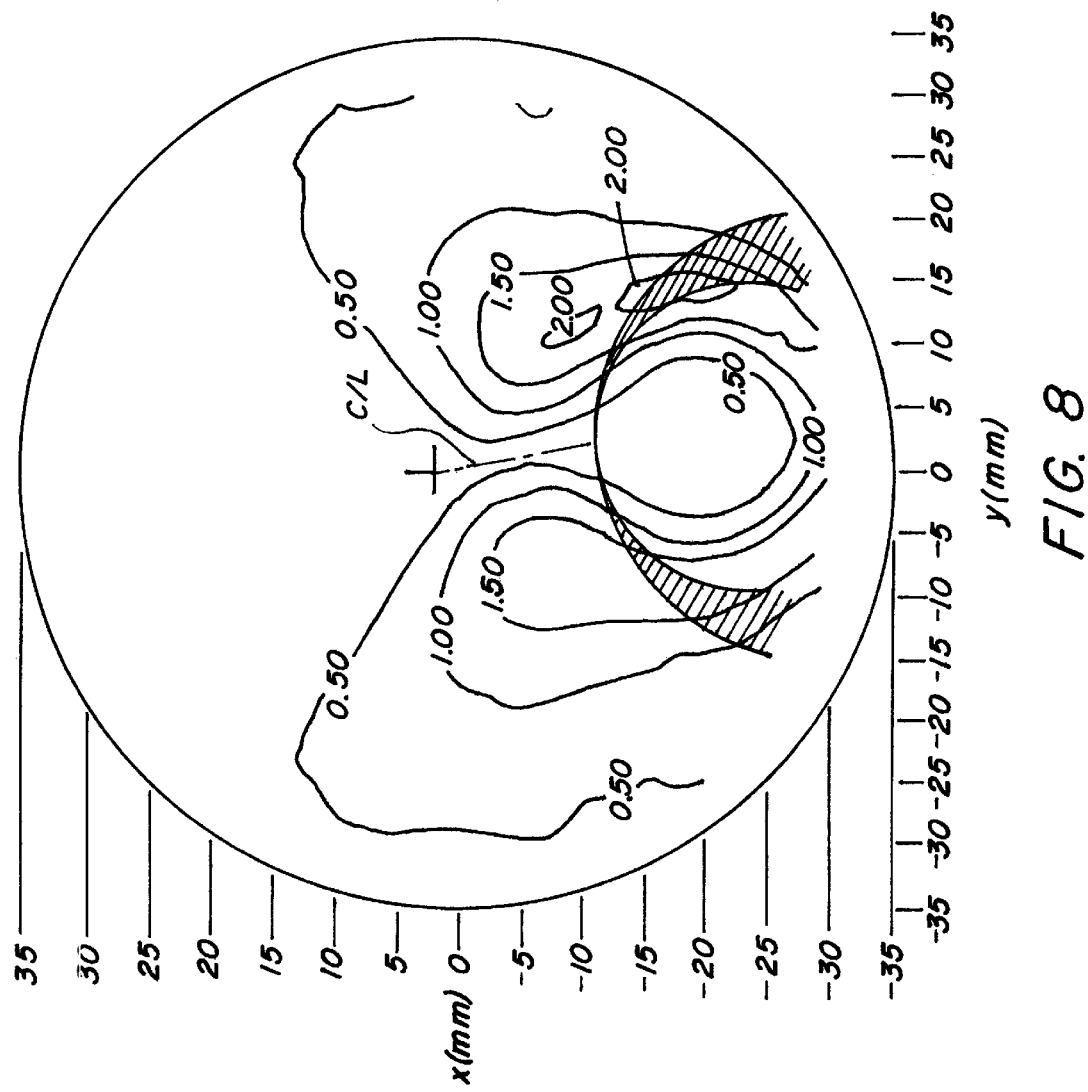
FIG. 8 shows schematically the distribution of surface astigmatism in a 2.50 D add embodiment of the invention having the discontinuous power law depicted in FIG. 7. Over most of the area of the lens, the astigmatism is the same as that of a 2.00 D add lens having a continuous power law. The power step generates a lens surface discontinuity which ultimately is spread over the blend zone 1 by virtue of the manufacturing process.

It is well known that the strength of the inherent surface astigmatism aberration of a progressive lens is proportional to the add power. The higher the add, the stronger the unwanted astigmatism and its association distortion. Moreover, the problem of managing these aberrations in a short corridor lens becomes especially acute for addition values of 2.50 D and above. In this second example (see FIGS. 7 and 8), a general reduction of aberration in a 2.50 D add lens is achieved by replacing the continuous meridional power law (eyepath profile) characteristic of the first example by a power law having a discontinuous step in power of 0.50 D at the lower end of the progressive corridor, i.e., at the point where the corridor leads into the reading portion of the lens. The discontinuous power law for this example is shown schematically in curve 2 in FIG. 7. Also shown for comparison in curve 1 is a continuous power law of the same 2.50 D addition. Thanks to the 0.50 power step, the astigmatism characteristics of the 2.50 add lens of EXAMPLE 2 are, over most of the area of the lens, identical with those of the 2.00 D add lens of EXAMPLE 1. Thus the inclusion of a power step achieves a significant reduction of aberration in relation to add power. This results in a lens having a 2.50 D add with a corridor of about 13 mm and a $\rho$ of about the same value as the $\rho$ value for the 2.0 D add lens of the first embodiment, i.e., about 4.1.

Unfortunately, the presence of the power step results in a step discontinuity in the surface of the lens extending laterally and growing quadratically in height with distance from the lower end of the corridor. This is the price paid for reducing the overall aberration level of the lens by means of a power step. For cosmetic reasons, the surface discontinuity must be blended into the area of the lens immediately surrounding it. The blending is accomplished automatically when the molds or lenses are manufactured by the slumping process. The area occupied by the blend is indicated schematically by the cross hatched area 10 of FIG. 8. This blend area is defined by arcs of first and second circles of different diameters, with the arcs being tangent to each other at a point on the centerline of the corridor and at the end of the corridor at the reading portion, and with the arcs extending outward and downward from the point of tangency to define a blend area 10 outwardly of each side of the reading area. Thus, the blend zone occupies the little-used areas on either side of the reading portion of the lens, where generally it will not be noticed or will be removed by the lens edging process.

Except for the power law discontinuity and the blend zones 10, the lenses of this second embodiment have the general characteristics and features of the lenses of the first embodiment, including the $\rho$ values and corridor lengths set forth in Table 1 for the 2.5–3.0 D add lenses (and lower adds if desired), with arcs 1, 2, 3, and 4 of the 30 mm superimposed circle centered 2 mm below the distance fitting center.

In the prior art lens of U.S. Pat. No. 4,062,629, a step discontinuity in the power law was similarly employed for the purpose of reducing the magnitude of the progressive aberration. In that case, however, the blend zone extended horizontally across the lens and could be easily detected by the wearer. The novel placement of the blend in the present invention renders it far less noticeable than in the case of the prior art.

By utilizing power law discontinuities, a short corridor lens series may be designed whose overall aberration level is significantly reduced relative to that of any prior art lens series. This design technique is especially advantageous in the design of lenses in the higher add range $\geq 2.50$ D. The power discontinuity can range from 0.25 D to 0.75 D.

Lenses of the present invention may be made by slumping and as set forth in U.S. Pat. No. 4,861,153 and U.S. Pat. No. 5,726,734, the entire contents of both of which are incorporated herein by reference.

As is known in the art, slumping is a glass lens and glass mold manufacturing process involving porous molds that have an upper surface contoured to match the desired surface contour of the lens to be formed. A glass lens or mold blank, generally having spherical front and back surfaces, is placed on a mold. The lens or mold is heated to a temperature at which the material will sag, and a vacuum is drawn through the mold to cause the upper surface of the lens to replicate to the contour of the mold.

It is to be understood that the term "lens" as used herein is intended to include the ophthalmic product in any and all forms common to the art, i.e., including lens blanks requiring second side (concave or convex) finishing as well as lenses finished on both side and "uncut" or "cut" (edged) to a size and shape required for spectacles frame glazing. The present lenses may be formed of glass or any one of the various known and used ophthalmic plastics. If second side finished, i.e., on the side opposite that having the progressive power surface, the second side may have prescription surface curvatures applied with the lens RP decentered in usual fashion.

Those skilled in the art will readily appreciate that there are many forms and adaptations of the invention not discussed herein which may be made to suit particular requirements. Accordingly, all such forms and adaptations are included within the scope of the invention as defined by the following claims.

What is claimed is:

1. A progressive power ophthalmic lens having:
   a distance zone;
   a distance fitting center;
   a near zone having a reading portion;

an intermediate zone having a short progressive corridor; and an astigmatism relationship, $\rho$, of at least 2.7 where $$\rho = <v>_{3+4}/<v>_{1+2},$$

and where $<v>_{1+2}$ is the gradient of surface astigmatism of the lens between diopter magnitudes $D_1$ and $D_2$ averaged over first and second arcs of a circle of 30 mm diameter superimposed on the lens and centered 2 mm directly below the distance fitting center of the lens, and where $<v>_{3+4}$ is the gradient of surface astigmatism of the lens between diopter magnitudes $D_1$ and $D_2$ averaged over third and fourth arcs of a circle of 30 mm diameter superimposed on the lens and centered 2 mm directly below the distance fitting center of the lens, said third and fourth arcs being in the lower hemispheres of said circle and being on opposite sides of said reading portion; and said first and second arcs being above said third and fourth arcs and being in regions of surface astigmatism of about 0.5 D or greater.

2. A progressive power ophthalmic lens as in claim 1 wherein each of said first, second, third and fourth arcs extends between isocurves of astigmatism of diopter magnitude $D_1$ and $D_2$, where $$D_1 = \frac{0.50 \times \Delta P}{2}, \text{ and}$$

$$D_2 = \frac{1.5 \times \Delta P}{2},$$

where $\Delta P$ is the addition value for the lens.

3. A progressive power ophthalmic lens as in claim 1 wherein:
the addition value of said lens is in the range of 1.00 diopters to 2.0 diopters;
the length of said short progressive corridor is 13 mm±1.5 mm; and
$\rho$ is in the range of a maximum value of about 5.0 to a minimum value of about 3.0.

4. A progressive power ophthalmic lens as in claim 1 wherein:
isocurves of 0.5 D astigmatism extend from below to above the distance fitting center of the lens on first and second sides of the distance fitting center of said lens and form an included angle of about 110°.

5. A progressive power ophthalmic lens as in claim 4 wherein:
the maximum value of inherent surface astigmatism does not exceed the addition value of the lens anywhere within said superimposed circle.

6. A progressive power ophthalmic lens as in claim 4 wherein:
said isocurves of 0.50 D astigmatism extend into said distance portion; and
said isocurves of 0.50 D astigmatism are separated by about 9 mm at the level of said distance fitting center in a lens of 2.00 D add.

7. A progressive power ophthalmic lens as in claim 1 wherein:
the addition value of said lens is in the range of 2.25 diopters to 3.0 diopters;
the length of said short progressive corridor is in the range of 14.0 mm±1.5 mm; and
$\rho$ is in the range of a maximum value of 4.0 to a minimum value of 2.7.

8. A progressive power ophthalmic lens as in claim 7 wherein:
the maximum value of inherent surface astigmatism does not exceed the addition value of the lens+0.25 D anywhere within said superimposed circle.

9. A progressive power ophthalmic lens having:
a distance zone;
a distance fitting center;
a near zone having a reading portion;
an intermediate zone having a short progressive corridor; and
an astigmatism relationship, $\rho$, of at least 2.7 where $$\rho = <v>_{3+4}/<v>_{1+2},$$

and where $<v>_{1+2}$ is the gradient of surface astigmatism of the lens averaged over first and second arcs of a circle of 30 mm diameter superimposed on the lens and centered 2 mm directly below the distance fitting center of the lens, and where $<v>_{3+4}$ is the gradient of surface astigmatism of the lens averaged over third and fourth arcs of a circle of 30 mm diameter superimposed on the lens and centered 2 mm directly below the distance fitting center of the lens;

said third and fourth arcs being in the lower hemispheres of said circle and being on opposite sides of said reading portion;

said first and second arcs being above said third and fourth arcs;

said progressive corridor continuously increasing in power from said distance portion toward said reading portion and having a discontinuous step of from 0.25 diopters to 0.75 diopters at the end of said corridor adjacent said reading portion;

said step of 0.25 D–0.75 D resulting in a surface discontinuity blended into the surface of the lens between arcs of first and second circles of different diameters, said arcs being tangent to each other at a point on the centerline of said progressive corridor and at the end of the corridor at the reading portion, and said arcs extending outwardly and downwardly from said point of tangency.

10. A progressive power ophthalmic lens as in claim 9 wherein each of said first, second, third and fourth arcs extends between isocurves of astigmatism of diopter magnitude $D_1$ and $D_2$, where $$D_1 = \frac{0.50 \times \Delta P}{2}, \text{ and}$$

$$D_2 = \frac{1.5 \times \Delta P}{2},$$

where $\Delta P$ is the addition value for the lens.

11. A progressive power ophthalmic lens as in claim 9 wherein:
the addition value of said lens is in the range of 1.00 diopters to 2.0 diopters;
the length of said short progressive corridor is 13 mm±1.5 mm; and ρ is in the range of a maximum value of about 5.0 to a minimum value of about 3.0.

12. A progressive power ophthalmic lens as in claim 9 wherein:

isocurves of 0.5 D astigmatism extend from below to above the distance fitting center of the lens on first and second sides of the distance fitting center of said lens and form an included angle of about 110°.

13. A progressive power ophthalmic lens as in claim 12 wherein:

the maximum value of inherent surface astigmatism does not exceed the addition value of the lens anywhere within said superimposed circle.

14. A progressive power ophthalmic lens as in claim 12 wherein:

said isocurves of 0.50 D astigmatism extend into said distance portion; and said isocurves of 0.50 D astigmatism are separated by about 9 mm at the level of said distance fitting center in a lens of 2.00 D add.

15. A progressive power ophthalmic lens as in claim 9 wherein:

the addition value of said lens is in the range of 2.25 diopters to 3.0 diopters;

the length of said short progressive corridor is in the range of 14.0 mm±1.5 mm; and ρ is in the range of a maximum value of 4.0 to a minimum value of 2.7.

16. A progressive power ophthalmic lens as in claim 15 wherein:

the maximum value of inherent surface astigmatism does not exceed the addition value of the lens+0.25 D anywhere within said superimposed circle.

17. A progressive power ophthalmic lens having:

a distance zone;

a distance fitting center;

a near zone having a reading portion;

an intermediate zone having a short progressive corridor; and a surface astigmatism relationship, ρ, having minimum values corresponding to add power of the lens as follows:

| Add | 1.00 | 1.25 | 1.50 | 1.75 | 2.00 | 2.25 | 2.50 | 2.75 | 3.00 |
|---|---|---|---|---|---|---|---|---|---|
| ρ | 5.0 | 3.7 | 4.0 | 4.2 | 4.1 | 3.6 | 3.7 | 3.5 | 3.0 | where $\rho = <v>_{3+4}/<v>_{1+2}$, and where $<v>_{1+2}$ is the gradient of surface astigmatism averaged over first and second arcs of a circle 30 mm in diameter superimposed on the lens and centered 2 mm directly below the distance fitting center of the lens, and where $<v>_{3+4}$ is the gradient of surface astigmatism averaged over third and fourth arcs of a circle 30 mm in diameter superimposed on the lens and centered 2 mm directly below the distance fitting center of the lens, said first, second, third and fourth arcs extending between isocurves of surface astigmatism of diopter magnitude $D_1$ and $D_2$, where $$D_1 = \frac{0.50 \times \Delta P}{2}$$

$$D_2 = \frac{1.50 \times \Delta P}{2}$$

where $\Delta P$ is the addition value for the lens.

18. A progressive power ophthalmic lens as in claim 17, wherein:

said first and second arcs extend between those portions of said isocurves located near the boundary between the distance and intermediate areas of the lens, and said third and fourth arcs extend between those portions of said isocurves located near the boundary between the reading and intermediate areas of the lens.

19. A progressive power ophthalmic lens as in claim 17 wherein:

isocurves of 0.5 D astigmatism extend from below to above the distance fitting center of the lens on first and second sides of the distance fitting center of said lens and form an included angle of about 110°.

20. A progressive power ophthalmic lens as in claim 17 wherein:

the maximum value of inherent surface astigmatism does not exceed the addition value of the lens anywhere within said superimposed circle.

21. A progressive power ophthalmic lens as in claim 17 wherein:

the maximum value of inherent surface astigmatism does not exceed the addition value of the lens+0.25 D anywhere within said superimposed circle.

* * * * *

UNITED STATES PATENT AND TRADEMARK OFFICE
CERTIFICATE OF CORRECTION

PATENT NO. : 6,142,627
DATED : November 7, 2000
INVENTOR(S) : John T. Winthrop

It is certified that error appears in the above-identified patent and that said Letters Patent is hereby corrected as shown below:

Title page,
Item [56], References Cited, OTHER PUBLICATIONS, insert -- "Astigmatism and mean power plots of Rodenstock Progressive S Perfalit lens (Sample #1228)", dated 07/28/98;
"Astigmatism and mean power plots of Sola VIP lens", dated 06/22/98;
"Astigmatism and mean power plots of Seiko P1 Wing ST lens (Sample #1277)", dated 09/03/98;
"Astigmatism and mean power plots of VCS 200L Varilux 200L lens (Sample #834)", dated 11/24/97;
"Astigmatism and mean power plots of VCS250R Varilux Comf 250R lens (Sample #835)", dated 11/24/97 --.

Signed and Sealed this

Nineteenth Day of August, 2003

JAMES E. ROGAN
*Director of the United States Patent and Trademark Office*